Feb. 23, 1960   R. T. FILLMAN   2,925,754
SINGLE HOOK BOMB RELEASE AND EJECTOR
Filed May 27, 1957
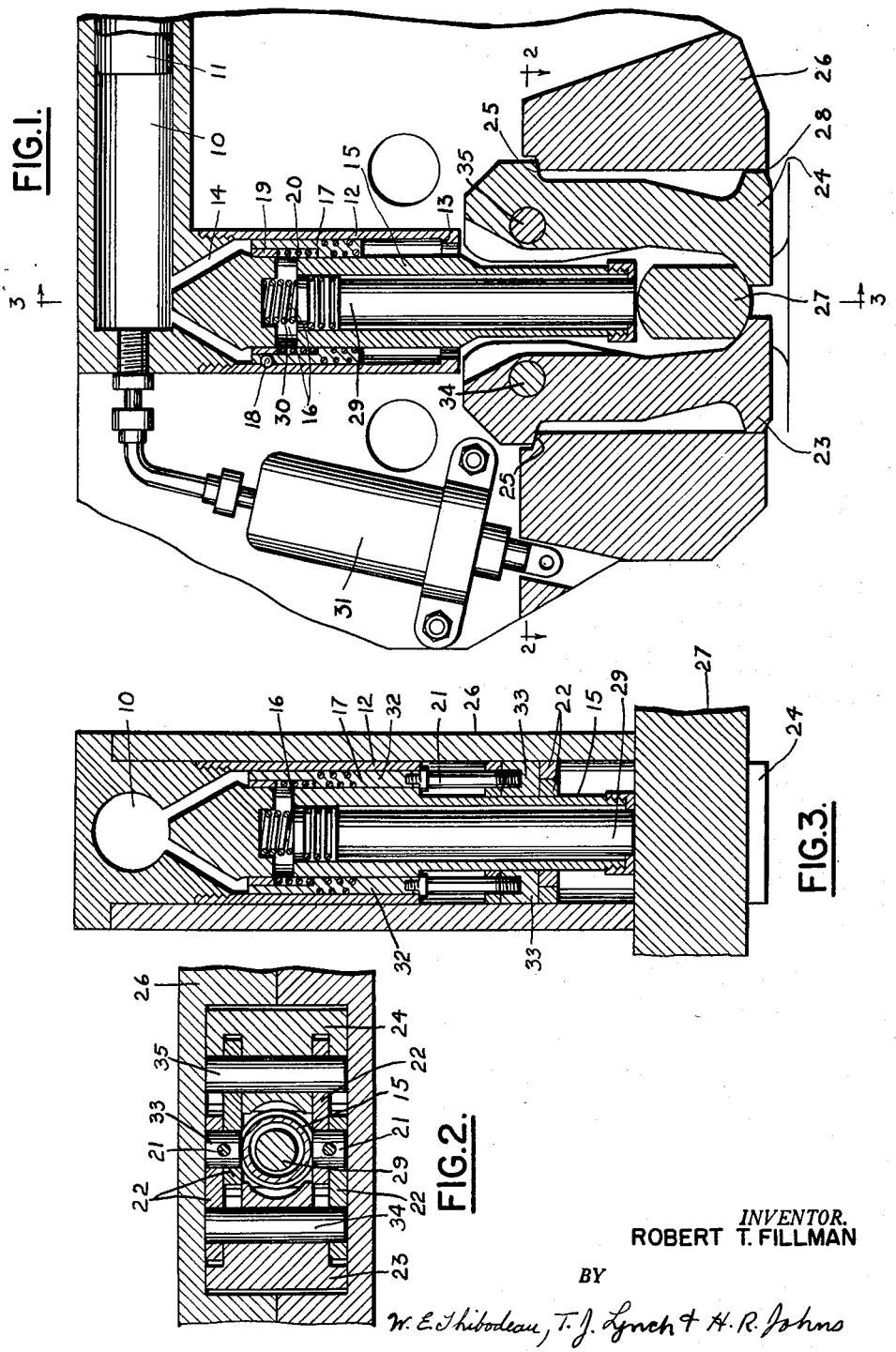
INVENTOR.
ROBERT T. FILLMAN
BY
W. E. Thibodeau, T. J. Lynch & H. R. Johns 2,925,754

SINGLE HOOK BOMB RELEASE AND EJECTOR

Robert T. Fillman, Philadelphia, Pa., assignor to the United States of America as represented by the Secretary of the Army Application May 27, 1957, Serial No. 661,981

1 Claim. (Cl. 89—1.5)

(Granted under Title 35, U.S. Code (1952), sec. 266)

The invention described herein may be manufactured and used by or for the Government for governmental purposes without the payment of any royalty thereon.

This invention relates to mechanisms for releasing and ejecting a bomb or other load from an airplane in flight, and particularly to an improved load releasing and ejecting mechanism which is constructed of relatively few parts and operates in response to the application of a gas under pressure.

Distinguishing features of this improved mechanism are its compactness and its location in close proximity to the parts to be operated for releasing and ejecting the load. Thus, concentric cylinders located adjacent to the parts to be operated have interposed between them a piston which moves to release the load and near the end of its movement opens an aperture through which gas under pressure is applied to a piston within the inner cylinder for ejecting the load.

The invention will be better understood from the following description when considered in connection with the accompanying drawings and its scope is indicated by the appended claim.

Referring to the drawings:

Fig. 1 is a sectional view of a load releasing and ejecting mechanism constructed in accordance with the present invention, Fig. 2 is a section taken on the line 2—2 of Fig. 1, and Fig. 3 is a section taken on the line 3—3 of Fig. 1.

The mechanism of Fig. 1 includes a chamber 10 adapted to receive a cartridge 11 for generating a gas under pressure. In lieu of the cartridge 11, bottled inert gas or the like may be used to actuate the mechanism.

Threadedly attached to the wall of the chamber 10 is an outer cylinder 12 which has near its lower end a ledge 13 and is open to the chamber 10 through a port 14. Concentric with the outer cylinder 12 is an inner cylinder 15 which is closed at one end and has apertures 16 near its closed end.

Between the cylinders 12 and 15 is an outer piston 17 which is fixed to the cylinder 12 by a ball detent 18 and a locking ring 19, a spring 20 being interposed between the locking ring 19 and the piston 17.

The piston 17 has at its opposite sides extensions 32 into which are threaded rods 21. At the other ends of these rods are short shafts 33 shown in Fig. 2. Two pairs of links 22 are pivotally secured at the adjacent ends of each link of each pair to one of said short shafts 33. The other end of each link 22 is pivotally secured around one of the pivot pins 34 or 35 for the hooks 23 and 24. In the drawing the hooks each rests on a shoulder 25 of the housing 26. When the links 22 are forced downward by the piston 17 pushing down on the short shafts 33, then the links 22 pull the pivot pins 34 and 35 toward each other after the manner of a toggle, far enough to disengage the hooks 23 and 24 from the shoulder 25 of housing 26.

When a gas under pressure is introduced into the chamber 10, however, the locking ring 19 is forced away from the closed end of the cylinder 15, and the ball detent releases the piston 17 so that it moves toward the open end of the cylinder 15. The weight of the load, illustrated as a bomb lug 27, then pulls the hooks down below the lower edge 28 of the housing 26 whereupon the load is released.

The travel of the piston 17 is terminated when it engages the shoulder 13 of the outer cylinder 12 and at this time the apertures 16 are uncovered so that the interior of the inner cylinder 15 is open to the chamber 10. Under these conditions, gas under pressure is applied to an inner piston 29, which is held in contact with the load 27 by a spring 30, and this piston moves forcibly to eject the load. Stated in another way the inner piston 29 forcefully pushes the bomb lug or load support 27 away from the hooks 23 and 24 after they have been lowered from their position shown in Fig. 1 in order to impart an acceleration to the load or bomb, which is in addition to that of gravity.

As indicated by Fig. 1, an initiator 31 may be provided as an auxiliary source of energy for emergency release or for disarming purposes.

I claim:

The combination with a load supporting and releasing device, of a mechanism for forcefully ejecting a load after its release, said mechanism including a chamber for fluid under pressure, a housing having shoulders for supporting said load prior to its release, a pair of hooks resting on said shoulders, a pivot pin through each hook, an outer cylinder opening into said chamber at one end and having an interior ledge at its other end, an inner cylinder within said outer cylinder and having an aperture adjacent the end of the outer cylinder which is connected with said chamber, an outer piston within said outer cylinder and movable to uncover said aperture, an inner piston within said inner cylinder, a spring biasing said inner piston into engagement with a load for holding it in contact with said hooks, locking means for said outer piston to retain it in position in said outer cylinder away from a load, said locking means being releasable in response to fluid pressure in said chamber and outer cylinder for moving said outer piston, a pair of links, a link of said pair pivoted to a short shaft at one end and to a pivot pin for one of said hooks, a rod connecting said outer piston and said short shaft whereby said rod may move said links to reduce the angle between them, pull said pivot pins closer together, and pull said hooks off said housing shoulders releasing said load, movement of the outer piston for releasing said load, for admitting fluid under pressure to said inner piston through said aperture said inner piston being capable of imparting a downward thrust to said load.

References Cited in the file of this patent

UNITED STATES PATENTS

| | | |
|---|---|---|
| 1,046,827 | McCollum | Dec. 10, 1912 |
| 2,393,962 | Ashton et al. | Feb. 5, 1946 |
| 2,673,557 | Sherman et al. | Mar. 30, 1954 |
| 2,726,576 | Musser | Dec. 13, 1955 |
| 2,822,207 | Steinmetz et al. | Feb. 4, 1958 |

FOREIGN PATENTS

| | | |
|---|---|---|
| 454,152 | Great Britain | Sept. 21, 1936 |